July 29, 1947.  G. P. BOSOMWORTH  2,424,919
METHOD OF MAKING MOLDS
Original Filed Sept. 21, 1940   2 Sheets-Sheet 1

INVENTOR
GEORGE P. BOSOMWORTH
BY Ely & Frye
ATTORNEYS

July 29, 1947.  G. P. BOSOMWORTH  2,424,919
METHOD OF MAKING MOLDS
Original Filed Sept. 21, 1940   2 Sheets—Sheet 2
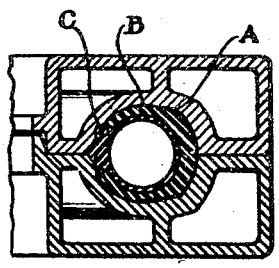
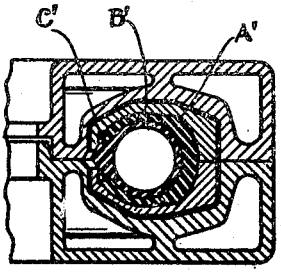
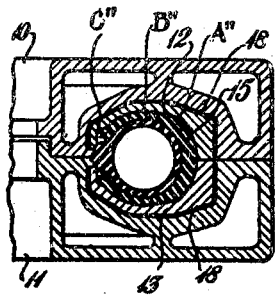
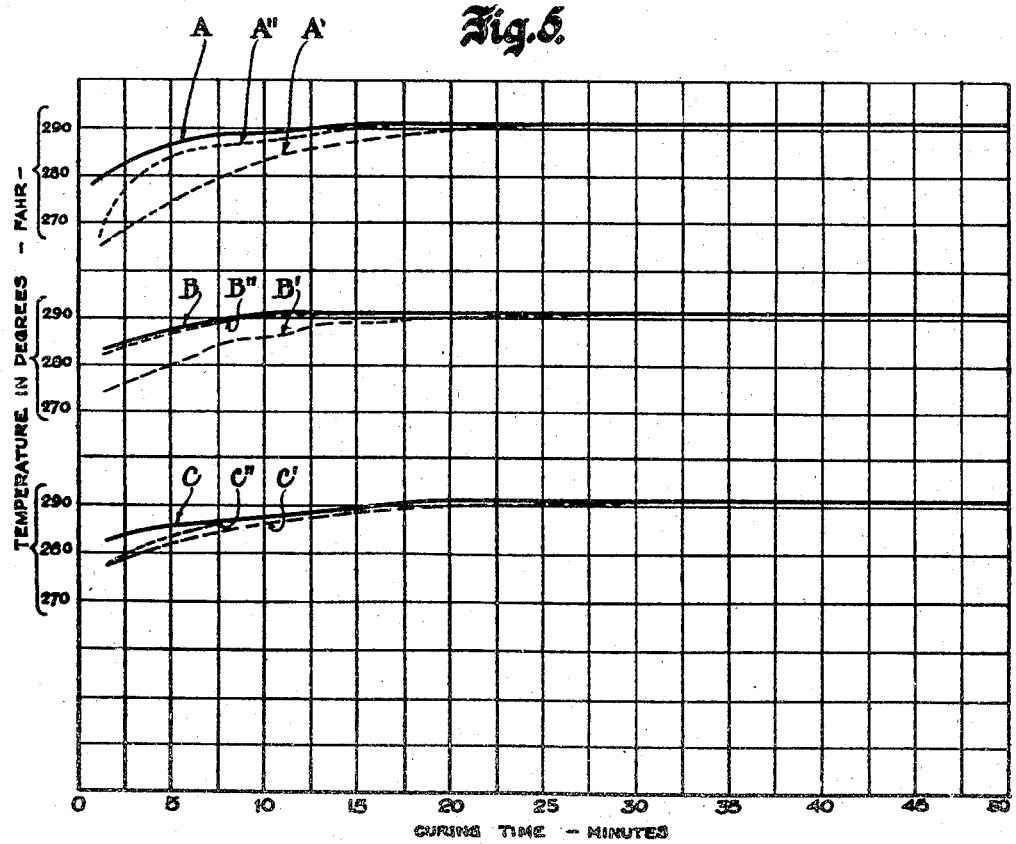
INVENTOR
GEORGE P. BOSOMWORTH
BY
ATTORNEYS Patented July 29, 1947

2,424,919

UNITED STATES PATENT OFFICE 2,424,919

METHOD OF MAKING MOLDS

George P. Bosomworth, Akron, Ohio, assignor to The Firestone Tire & Rubber Company, Akron, Ohio, a corporation of Ohio Original application September 21, 1940, Serial No. 357,709. Divided and this application March 23, 1944, Serial No. 527,783

4 Claims. (Cl. 29—148.2)

This invention relates to methods of making molds, and more especially it relates to the method of making pneumatic tire molds of the insert type. The present application is a division of my copending application, Serial No. 357,709, filed September 21, 1940.

Molds of the character mentioned comprise upper and lower mold sections which are steam jacketed, and ring inserts removably mounted in the respective mold sections, which inserts correspond to the particular tire size and are suitably engraved to impart the desired external configuration to tires molded and vulcanized therein. Thus by means of inter-changeable inserts a single mold may be utilized for the manufacture of a number of different tire sizes and designs.

Each insert nests in its respective mold section, and the confronting surfaces of insert and mold section heretofore have required to be machined with extreme accuracy to insure a nice fit. Because of the irregular contour of the confronting faces of the insert and mold section, a perfect fit was difficult to obtain, with the result that spaces or air gaps of as much as several thousandths of an inch in width frequently occurred. Moreover, the heat and pressures to which the mold was subjected during use frequently caused warping of the mold section or insert such as to create air gaps between their confronting faces.

In the vulcanizing of a tire casing in an insert mold of the character mentioned under ideal conditions, steam is circulated through the jackets of the respective mold sections, heat from the steam being transferred to the exterior of the tire through a path consisting of the jacket wall and the wall of the insert. The presence of steam scale in the mold jacket somewhat impairs the conductance of heat, but with this feature of the problem this invention is not concerned. The presence of an air gap between the mold section and insert also exerts a retarding effect upon heat transfer to the tire in direct proportion to the width of said gap. Heat is transferred across the air gap by radiation and by conduction through the air film. Experience has shown, for example, that in cases where the total thickness of metal (iron) traversed by the heat is 1 inch, and without scale, a .010″ gap in the metal reduces the conductance to about 1/15 of the conductance of solid metal. Thus the desirability of eliminating gaps between inserts and mold sections will be apparent, it being especially desirable at the tread portion of the mold where the thick rubber tread portion of a tire absorbs more heat than other portions of the tire.

The chief objects of the invention are to produce pneumatic tire casings of superior quality due to uniformity of vulcanization throughout their respective structures; to provide a method of making an improved insert mold without gaps between the confronting faces of the inserts and mold sections; to provide a method of making an improved heat transfer in insert molds. More specifically the invention aims to make a tire vulcanizing insert mold having a thin layer of heat conducting material completely filling a space between the confronting faces of the inserts and mold sections. Other objects will be manifest as the description proceeds.

Of the accompanying drawings:

Figure 2 is a similar section, on a smaller scale, of a conventional steam jacketed tire mold;

Figure 3 is a section similar to Figure 2, of a steam jacketed insert mold, having an air gap between the inserts and the mold sections;

Figure 4 is a section of the improved mold shown in Figure 1, on a smaller scale; and Figure 5 is a composite graph showing the comparative time required to bring various parts of a tire up to vulcanizing temperature in each of the molds shown in Figures 2, 3 and 4.

Figure 1:
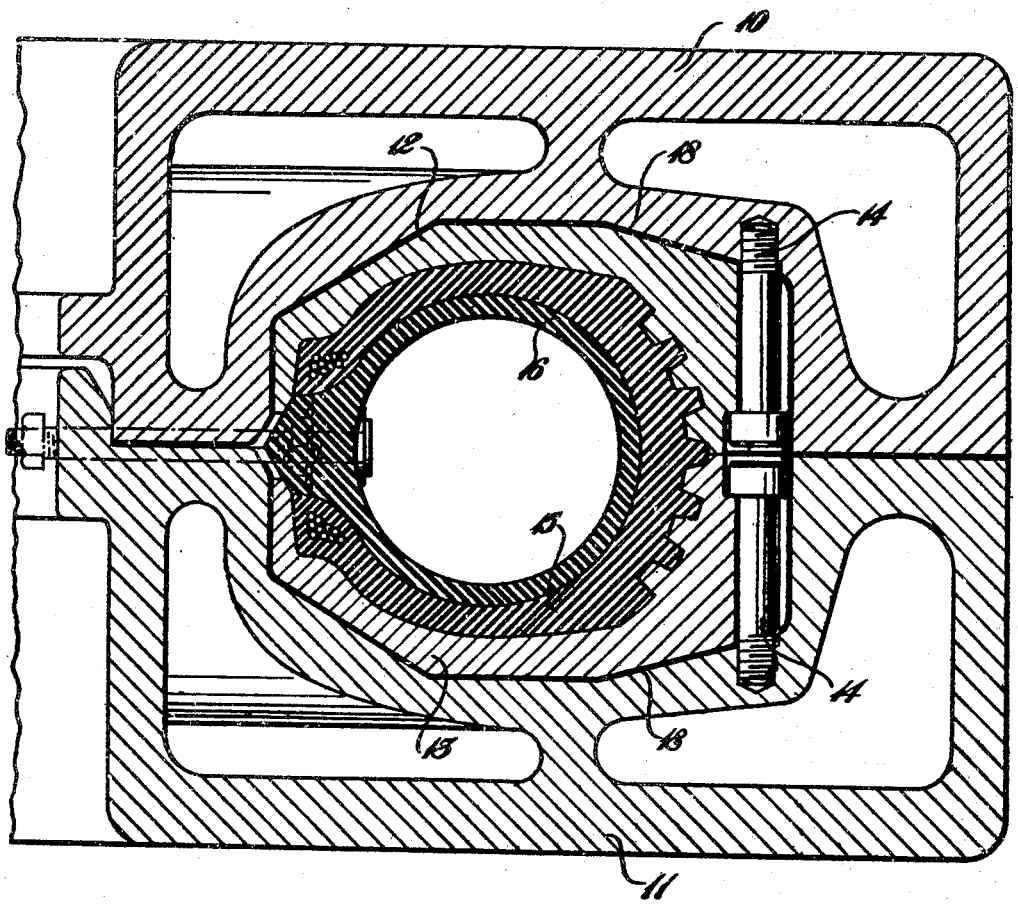
Figure 1 is a transverse section through a portion of a tire mold embodying the invention, and a tire casing and expansible core therein.

Referring to Figure 1 of the drawings, there is shown a mold comprising annular mating upper and lower jacketed mold sections 10, 11 respectively, and annular inserts 12, 13 removably mounted within the respective mold sections, the inserts being secured to the mold sections by any suitable means, such as the set screws 14, 14. The inserts 12, 13 are metal castings formed with respective molding cavities that are suitably machined or engraved to impart the desired external configuration to tires, one of the latter being shown therein at 15. Within the tire 15 is the usual expansible core 16 that applies heat and pressure interiorly of the tire to force it into conformity with the design of the mold inserts, and to supplement the heat applied to the exterior of the tire during the vulcanization of the latter.

Between the confronting faces of each insert 12, 13 and its companion mold section is a relatively thin stratum of metal 18 of good thermal conductivity, which metal completely fills the space between each insert and its mold section. The metal 18 is a low melting point alloy, its melting point, however, being higher than the maximum temperature required for vulcanizing tires in the mold. An alloy of 10% bismuth, 40% lead, and 50% tin has been found to be suitable for the purpose, said alloy having a melting point of 329° F.

In the manufacture of molds of the character described the metal 18 is prepared in the form of a thin sheet or foil which may be .010″ thickness, and if desired, annular pieces of sufficient size to cover the confronting faces of the mold sections may be cut therefrom. Then while the mold insert is removed from a mold section, the annular piece of foil is positioned over the cavity of the mold. Thereafter the insert of the mold section is installed therein and forced into place by the setting up of the set screws 14, the foil interposed between the mold section and insert being thereby deformed into conformity with the confronting surfaces of mold section and insert. After both sections of the mold have been prepared as described, the mold is closed and the sections thereof forced tightly together, and concurrently steam at a temperature of approximately 340° F. is circulated through the steam jackets of the mold sections. This results in the fusing or melting of the alloy foil, the pressure of the inserts in the direction of their companion mold sections causing the melted alloy to flow and thus completely to fill the narrow gaps or air spaces between the inserts and mold sections with a thin film of metal. Some of the alloy may flow into the space about the set screws 14 as shown, but this is not objectionable. Thereafter, the circulation of the steam is discontinued, and as the mold cools the alloy solidifies. After the mold is opened, any surplus or overflow alloy may be trimmed from the mold sections by means of a knife. The set screws 14 are then turned if possible to assure their tightness, after which the mold is ready for use in the vulcanization of tires.

The fusing of the alloy does not cause it to unite with the metal of the inserts and mold sections. The alloy does not fuse during use of the mold for vulcanizing tires since the steam employed normally for vulcanization does not exceed 300° F. Thus the alloy remains in place as long as the mold sections and inserts remain in assembled relation. If it is desired to replace the inserts 12, 13 with inserts of different cavity size or engraving, said inserts may be removed in the usual manner after removal of the set screws 14. The alloy strata 18 then readily may be stripped from the mold parts to which they are lightly adhered. The procedure described is repeated in the mounting of other inserts in the mold sections. The alloy stripped from the mold may be used again after being melted and re-sheeted.

The comparative value of the alloy 18, used as shown and described, as a means for improving the thermal conductivity of insert molds for rubber tires, is graphically shown in Figure 5. Comparison is made with the conventional steam jacketed tire mold without inserts, such as is shown in Figure 2, and an ordinary steam jacketed insert mold for tires, as shown in Figure 3, wherein there are gaps or air spaces between the inserts and the mold section. The relative extent and width of such gaps is exaggerated in the drawing to provide clearness of illustration. The improved mold of this invention is shown in Figure 4. For the preparation of the data set forth in Figure 5, thermo-couples were mounted at identical points in each of the molds shown in Figures 2, 3, and 4, between the tires therein and the surface of the molding cavities, said points being located at the shoulder of the tire tread therein, at the sidewall of the tire, and at the bead of the tire. In Figure 2 said points are designated A, B, and C respectively. In Figure 3 the same points are designated A', B', and C', and in Figure 4 they are designated A″, B″, and C″. The tires were then subjected to pressure, and to vulcanizing temperature through the agency of the mold steam jackets, and expansible cores, in the usual manner and for the usual duration of time, identical treatment being given each mold. The temperatures recorded by the thermo-couples of the three molds are integrated and presented in graphic form in Figure 5.

Figure 5 is a composite graph and shows the development of temperature at the several points on the tires. Thus the upper graph shows the comparative temperatures at the shoulders of the tires, the intermediate graph shows the comparative temperatures at the sidewalls of the tires, and the lower graph shows the comparative temperatures at the beads of the tires. The temperature of the steam in the steam jackets of the molds is 298°–300° F., and this will produce a temperature of 292° F. at the surface of the tires in said molds, this being the optimum vulcanizing temperature. Since time and temperature are factors in effecting vulcanization of rubber, it follows that the sooner the rubber is subjected to optimum vulcanizing temperature, the sooner vulcanization will be completed. The graphs of Figure 5 clearly show that optimum vulcanizing temperature in all parts of a tire is first reached in molds without inserts, of the type shown in Figure 2. Closely approaching the results of the mold of Figure 2 is the improved mold of this invention shown in Figure 4. In the mold shown in Figure 3 there is considerable time lag in all regions thereof before the tire attains optimum vulcanizing temperature.

The foregoing data clearly show that the mold used to illustrate the invention is superior in thermal conductivity as compared to ordinary insert molds, and only slightly inferior to conventional tire molds without inserts. Such inferiority, however, is more than compensated for by the several other advantages inherent in tire molds of the insert type.

Modification may be resorted to without departing from the spirit of the invention, or the scope thereof as defined by the appended claims.

What is claimed is:

1. The method of making sectional molds for vulcanizing rubber products, said method comprising positioning thin foil of a low melting point metal alloy in the space between the confronting surfaces of a steam jacketed mold section formed with a recess and a molding insert mountable therein, said melting point being higher than the highest temperature required to vulcanize rubber, pressing the insert into said recess against said foil thereby shaping said interposed metal foil roughly into conformity with the space between the insert and mold section, and then circulating steam, of higher temperature than normally required for vulcanization, through the steam jacket of the mold section while continuing to urge the insert into its recess, whereby the foil is fused and flowed so as completely to fill the space between insert and mold section, and then solidifying the foil by discontinuing the circulation of steam through said steam jackets.

2. The method of eliminating the narrow air gaps between the confronting faces of the insert and the mold of a jacket mold of the class described comprising the steps of forming thin annular pieces from sheets of foil each with an area sufficient to cover a said confronting face, placing said piece over each said face of said mold before said inserts are associated therewith, positioning said inserts relative to said mold with said pieces interpositioned between said confronting faces preparatory to forcing said inserts into their final associated position relative to said mold, concurrently closing said mold and circulating steam therethrough at a temperature sufficient to fuse said foil and with pressure sufficient to cause said foil to flow, thereby causing the melted foil to flow and completely occupy the space between said confronting spaces, the fusing point of said foil being at a temperature higher than the maximum temperature required to vulcanize rubber, permitting said mold to cool and removably uniting said mold and inserts by suitable attachment means.

3. The method of making sectional molds of the class described comprising positioning sheet metal alloy having a low melting point, but higher than the maximum temperature required for vulcanizing tires, between the confronting surfaces of the mold sections and the mold inserts, simultaneously fusing said alloy by circulating steam at higher temperature than is required for vulcanization of tires in said molds, and urging said inserts by mold attachment means into said recesses against the fused alloy with sufficient pressure to cause the alloy to flow and completely to fill the spaces between said inserts and mold sections, and then solidifying the fused alloy by cooling, whereby air gaps between the inserts and the mold sections are avoided.

4. The method of eliminating the narrow air gaps which exist between the confronting surfaces of the inserts and their companion tire mold sections of a jacket mold of the class described comprising the steps of placing thin sheets of low melting metal foil, said foil having a melting point higher than the maximum temperature required for vulcanizing tires, over the mold cavities of the mold sections, progressively installing companion inserts in said mold sections and forcibly pressing said inserts into said cavities against said sheets of foil by means of insert attaching bolts thus forcing said sheets into said cavities and causing the sheets to roughly conform to the shape of the narrow spaces between said sections and inserts, closing said mold with said inserts being pressed firmly against said foil, circulating steam through the steam circulation system of said jacket mold, said steam being at a temperature sufficient to fuse said foil, said pressure on said inserts and foil being maintained while said foil is in a fused state, whereby the foil conforms to and completely fills said space, lowering the temperature of the mold sufficiently to solidify said foil, and next trimming away any excess over-flowage of the foil and tightening the attaching bolts to insure a tight fit of the inserts to their mold sections.

GEORGE P. BOSOMWORTH.

REFERENCES CITED

The following references are of record in the file of this patent:

UNITED STATES PATENTS

| Number | Name | Date |
|---|---|---|
| 1,615,471 | Midgley | Jan. 25, 1927 |
| 1,550,157 | Gillette | Aug. 18, 1925 |
| 1,550,153 | Emmet et al. | Aug. 18, 1925 |
| 1,615,474 | Midgley | Jan. 25, 1927 |
| 1,625,697 | Baker | Apr. 19, 1927 |

FOREIGN PATENTS

| Number | Country | Date |
|---|---|---|
| 178,205 | Great Britain | 1922 |
| 26,573 | Australia | 1930 |